(12) United States Patent
Aikawa et al.

(10) Patent No.: US 7,628,013 B2
(45) Date of Patent: Dec. 8, 2009

(54) CONTROL DEVICE OF CHARGE COMPRESSION IGNITION-TYPE INTERNAL COMBUSTION ENGINE

(75) Inventors: Hidefumi Aikawa, Susono (JP); Tatsuo Kobayashi, Susono (JP); Fumito Chiba, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 590 days.

(21) Appl. No.: 11/130,195

(22) Filed: May 17, 2005

(65) Prior Publication Data

US 2005/0252464 A1 Nov. 17, 2005

(30) Foreign Application Priority Data

May 17, 2004 (JP) ............................. 2004-146624

(51) Int. Cl.
*F01N 7/00* (2006.01)
(52) U.S. Cl. ................. 60/324; 60/285; 123/90.11; 123/90.15; 123/568.11; 123/568.14
(58) Field of Classification Search ................. 60/285, 60/324; 123/58.8, 568.11–569.14, 90.11–90.15
See application file for complete search history.

(56) References Cited

U.S. PATENT DOCUMENTS

| | | | | |
|---|---|---|---|---|
| 4,424,790 A | * | 1/1984 | Curtil | 123/559.1 |
| 4,561,253 A | * | 12/1985 | Curtil | 60/606 |
| 4,910,960 A | * | 3/1990 | Ueki et al. | 60/312 |
| 5,355,673 A | * | 10/1994 | Sterling et al. | 60/324 |
| 5,682,854 A | * | 11/1997 | Ozawa | 123/316 |
| 6,012,424 A | * | 1/2000 | Meistrick | 123/321 |
| 6,170,474 B1 | * | 1/2001 | Israel | 123/568.14 |
| 6,230,683 B1 | * | 5/2001 | zur Loye et al. | 123/435 |
| 6,381,952 B1 | * | 5/2002 | Asanuma et al. | 60/284 |
| 6,439,210 B1 | * | 8/2002 | Faletti et al. | 123/568.14 |
| 6,519,933 B2 | * | 2/2003 | Ogiso et al. | 60/285 |
| 6,553,959 B2 | * | 4/2003 | Xu et al. | 123/295 |
| 6,601,563 B2 | * | 8/2003 | Funke et al. | 123/321 |
| 6,640,771 B2 | * | 11/2003 | Fuerhapter | 123/295 |
| 6,729,126 B2 | * | 5/2004 | Ogiso et al. | 60/285 |

(Continued)

FOREIGN PATENT DOCUMENTS

JP   A 10-266878   10/1998

(Continued)

*Primary Examiner*—Tu M Nguyen
(74) *Attorney, Agent, or Firm*—Oliff & Berridge, PLC

(57) ABSTRACT

A control device is applied to a multi-cylinder 4-cycle charge compression ignition-type internal combustion engine. The control device operates to open an exhaust valve in an exhaust stroke of each cylinder, operates to close an intake valve before an intake bottom dead center, and then, operates to open the exhaust valve again before the intake bottom dead center. An exhaust flow rate regulating valve is disposed in a collecting portion of an exhaust path and its opening is controlled. Hereby, a period in which the exhaust valve is open in an intake stroke of one cylinder and a period in which the exhaust valve is open in an exhaust stroke of another cylinder partially overlap each other. Combustion gas pushed out of a combustion chamber of the other cylinder in the overlapping period is pushed into a combustion chamber of the one cylinder via the exhaust path.

10 Claims, 10 Drawing Sheets

U.S. PATENT DOCUMENTS

| | | | |
|---|---|---|---|
| 6,761,147 B2 * | 7/2004 | Majima | 123/399 |
| 6,823,661 B2 * | 11/2004 | Minami | 60/285 |
| 6,932,062 B2 * | 8/2005 | Kuzuyama et al. | 123/568.13 |
| 7,275,514 B2 * | 10/2007 | Kuo et al. | 123/299 |
| 7,334,549 B2 * | 2/2008 | Lewis et al. | 123/90.11 |
| 2004/0045283 A1 * | 3/2004 | Asada | 60/285 |

FOREIGN PATENT DOCUMENTS

| | | |
|---|---|---|
| JP | A 11-132066 | 5/1999 |
| JP | A 11-343874 | 12/1999 |
| JP | A 2000-73770 | 3/2000 |
| JP | A 2002-529651 | 9/2002 |
| WO | WO 00/28198 | 5/2000 |

* cited by examiner

CONTROL DEVICE OF CHARGE COMPRESSION IGNITION-TYPE INTERNAL COMBUSTION ENGINE

BACKGROUND OF THE INVENTION

1. Field of the Invention

The present invention relates to a control device of a multi-cylinder 4-cycle charge (homogeneous charge or stratified charge) compression ignition-type internal combustion engine that performs charge compression ignition combustion in which air-fuel mixture formed in a combustion chamber is compressed and is ignited by itself.

2. Description of the Related Art

It is considered that, to reduce an amount of NOx generated by combustion in an internal combustion engine, self ignition combustion that air-fuel mixture is ignited by itself by compressing the air-fuel mixture of an extremely lean air-fuel ratio formed in a combustion chamber and is combusted in extremely short time is useful. In a homogeneous charge compression ignition-type internal combustion engine that performs the self ignition combustion, knocking is hardly caused even if air-fuel mixture is highly compressed, compared with air-fuel mixture in an internal combustion engine using spark ignition. Therefore, reduction of fuel consumption is also expected by combusting the highly compressed air-fuel mixture.

To combust air-fuel mixture by self ignition, it is necessary to increase the temperature of the air-fuel mixture. In prior arts, therefore, air-fuel mixture used for combustion is formed by mixing high-temperature combustion gas with air and fuel. The amount of combustion gas required for igniting the air-fuel mixture by itself generally increases as the amount of air required increases according to a driving state.

Japanese Patent Application Laid-Open (kokai) No. 1999-132066 (claim 1, FIGS. 1 to 4) discloses an engine that simultaneously takes air and combustion gas to utilize combustion gas for forming air-fuel mixture. In this disclosed art, when two intake valves are opened and air is taken into a combustion chamber, one of two exhaust valves is opened. Hereby, combustion gas remaining in an exhaust path is taken into the combustion chamber together with the air. In the engine, however, as the air and the combustion gas are simultaneously taken into the combustion chamber, the combustion gas taken into the combustion chamber interferes with the air taken in. Therefore, for example, when a large amount of air is preferentially obtained due to a large load of the internal combustion engine, the amount of combustion gas becomes insufficient compared with a desired amount. As a result, self ignition combustion may become unstable. Further, since the engine takes combustion gas remaining in the exhaust path into the combustion chamber by the decrease of pressure (cylinder pressure) in the combustion chamber by the increase of the volume of the combustion chamber in an intake stroke, a large amount of combustion gas cannot be taken.

As described above, in the prior art, the amount of air and combustion gas which can be taken into the combustion chamber is limited. Therefore, it is difficult to realize stable combustion by self ignition in a wide operating range.

SUMMARY OF THE INVENTION

The invention is made to solve the above-mentioned problem and one of the objects is to provide a control device of a multi-cylinder 4-cycle charge compression ignition-type internal combustion engine that can expand an operating range where stable self ignition combustion can be realized.

The control device according to the invention for achieving the object is applied to the internal combustion engine having three or more cylinders including an intake port formed in a cylinder head to supply air into a combustion chamber, an intake valve for opening and closing the intake port, an exhaust port formed in the cylinder head to exhaust combustion gas in the combustion chamber from the combustion chamber and an exhaust valve for opening and closing the exhaust port, and an exhaust path including plural independent passages communicating with exhaust ports of the plural cylinders and a collecting portion in which combustion gas flowing through the passages joins together.

Further, the internal combustion engine to which the control device according to the invention is applied is configured so that the each of cylinders repeats four strokes of an intake stroke from an exhaust top dead center to an intake bottom dead center, a compression stroke from the intake bottom dead center to a compression top dead center, an expansion stroke from the compression top dead center to an expansion bottom dead center and an exhaust stroke from the expansion bottom dead center to the exhaust top dead center every time a crankshaft rotates by 720 degrees.

In addition, the internal combustion engine to which the control device according to the invention is applied is configured so that a crank angle between the exhaust top dead center of one of the plural cylinders and the exhaust top dead center of another cylinder that reaches its exhaust top dead center immediately after the exhaust top dead center of the one cylinder of the plural cylinders is an angle obtained by dividing 720 degrees by the number of the cylinders. For example, if the number of the plural cylinders is 3, the crank angle is 240 degrees. Further, the internal combustion engine to which the control device according to the invention is applied is a multi-cylinder 4-cycle charge compression ignition-type internal combustion engine in which air-fuel mixture formed in the combustion chamber is compressed in the compression stroke and is ignited by itself (begins to burn by itself).

The control device according to the invention comprises an exhaust flow rate regulating valve, exhaust flow rate regulating valve control means, intake valve control means and exhaust valve control means.

The exhaust flow rate regulating valve is disposed in the collecting portion of the exhaust path. An opening of the exhaust flow rate regulating valve is controlled so as to vary the cross-sectional opening area of the collecting portion in such a manner that an amount of the combustion gas exhausted to the exterior of the engine via the collecting portion of the exhaust path is changed. The exhaust flow rate regulating valve control means controls the exhaust flow rate regulating valve so that the opening of the exhaust flow rate regulating valve is adjusted.

The intake valve control means opens the intake valve at a predetermined intake valve opening timing so that the intake valve is open during at least part of the intake stroke, and closes the opened intake valve at an intake valve closing timing before the intake bottom dead center.

The exhaust valve control means includes first exhaust valve control means that opens the exhaust valve at a predetermined first exhaust valve opening timing so that the exhaust valve is open during at least part of the exhaust stroke and closes the opened exhaust valve at a first exhaust valve closing timing before the intake valve closing timing, and second exhaust valve control means that opens the exhaust valve at a second exhaust valve opening timing between the intake valve closing timing and the intake bottom dead center and closes the opened exhaust valve at a second exhaust valve closing timing before the compression top dead center.

Hereby, a desired amount of air is taken into the combustion chamber while the intake valve is open, then the intake valve is closed before the intake bottom dead center. After that, the exhaust valve is opened. As a result, the combustion gas in the exhaust path is supplied to the combustion chamber. That is, when the intake valve is closed, the combustion gas flows into the combustion chamber. Further, the opening of the exhaust flow rate regulating valve disposed in the collecting portion of the exhaust path is controlled so as to change the amount of combustion gas flowing downstream from the exhaust flow rate regulating valve.

Therefore, since air and combustion gas do not simultaneously flow into the combustion chamber, the combustion gas flowing into the combustion chamber does not interfere with the flow of air taken into the combustion chamber. In addition, the air flowing into the combustion chamber is not pushed back to the intake port by the combustion gas. Further, as the pressure in the exhaust path on the upstream side of the collecting portion is appropriately increased by controlling the opening of the exhaust flow rate regulating valve, this pressure enables a large amount of combustion gas to flow into the combustion chamber already filled with air. As a result, since air-fuel mixture including air and combustion gas respectively of desired amounts according to the operational state of the engine can be formed, stable combustion by self ignition in a wider operating range can be achieved.

Since the intake valve is closed before the intake bottom dead center, a period in which air is taken into the combustion chamber is short. As a result, loss when the air passes a throttle including a throttle valve of an intake system and the intake valve is decreased and the fuel consumption can be reduced.

In this case, it is desirable that the exhaust valve control means sets the first exhaust valve opening timing, the first exhaust valve closing timing, the second exhaust valve opening timing and the second exhaust valve closing timing so that a period in which the exhaust valve of one of the plural cylinders is open by the second exhaust valve control means and a period in which the exhaust valve of another cylinder of the plural cylinders is open by the first exhaust valve control means partially overlap each other.

Hereby, a period since the exhaust valve of one cylinder (an arbitrary cylinder of the plural cylinders) is opened in the intake stroke until the exhaust valve is closed and a period in which the exhaust valve of another cylinder is open in the exhaust stroke partially overlap each other.

As a result, combustion gas pushed out of the combustion chamber of another cylinder is pushed into the combustion chamber of one cylinder via the exhaust path. Hereby, more of combustion gas can be supplied to the combustion chamber.

In this case, it is desirable that the control device of the multi-cylinder 4-cycle charge compression ignition-type internal combustion engine further includes operational state obtaining means for obtaining the operational state of the internal combustion engine, and the exhaust flow rate regulating valve control means controls the exhaust flow rate regulating valve so that the opening of the exhaust flow rate regulating valve is controlled according to the obtained operational state.

Hereby, since the opening of the exhaust flow rate regulating valve is controlled according to the obtained operational state, the amount of combustion gas taken into the combustion chamber via the exhaust path can be equal to a desired amount according to the operational state. Hereby, the temperature of air-fuel mixture used for next combustion can be controlled to a desired temperature according to the operational state and thus stable combustion by self ignition can be achieved.

In this case, it is desirable that the control device of the multi-cylinder 4-cycle charge compression ignition-type internal combustion engine further includes the temperature of the combustion gas obtaining means for obtaining the temperature of the combustion gas exhausted from the combustion chamber, and the exhaust flow rate regulating valve control means controls the exhaust flow rate regulating valve so that as the obtained temperature of the combustion gas decreases, the opening of the exhaust flow rate regulating valve is decreased.

Hereby, since the opening of the exhaust flow rate regulating valve is decreased as the obtained temperature of combustion gas decreases, a larger amount of the combustion gas can be taken into the combustion chamber. Hereby, even if the temperature of exhausted combustion gas varies, the temperature of air-fuel mixture formed in the combustion chamber can be closer to the desired temperature. Therefore stable combustion by self ignition can be achieved.

In the meantime, the control device of the multi-cylinder 4-cycle charge compression ignition-type internal combustion engine may include operational state obtaining means for obtaining the operational state of the internal combustion engine and ignition timing estimating means for estimating the ignition timing of the preceding combustion. The exhaust flow rate regulating valve control means may control the exhaust flow rate regulating valve so that when the estimated ignition timing is later than a reference value of ignition timing according to the obtained operational state, the opening of the exhaust flow rate regulating valve is decreased and when the estimated ignition timing is earlier than the reference value, the opening of the exhaust flow rate regulating valve is increased.

Hereby, the ignition timing of the preceding combustion is estimated, when the estimated ignition timing is later than the reference value of ignition timing according to the obtained operational state, the opening of the exhaust flow rate regulating valve is decreased, and when the estimated ignition timing is earlier, the opening of the exhaust flow rate regulating valve is increased.

As a result, when the ignition timing of the preceding combustion is later than the reference value of ignition timing according to the operational state, the combustion gas to be taken into the combustion chamber can be increased. Hereby, the temperature of air-fuel mixture formed in the combustion chamber can be increased and the ignition timing of the next combustion can be earlier. In the meantime, when the ignition timing of the preceding combustion is earlier than the reference value of ignition timing according to the operational state, the combustion gas to be taken into the combustion chamber can be decreased. Hereby, the temperature of air-fuel mixture formed in the combustion chamber can be decreased, and therefore, the ignition timing of the next combustion can be later. Thereby, the ignition timing can be closer to the reference value of ignition timing according to the operational state and stable combustion by self ignition can be achieved.

DETAILED DESCRIPTION OF THE PREFERRED EMBODIMENTS

Figure 1:
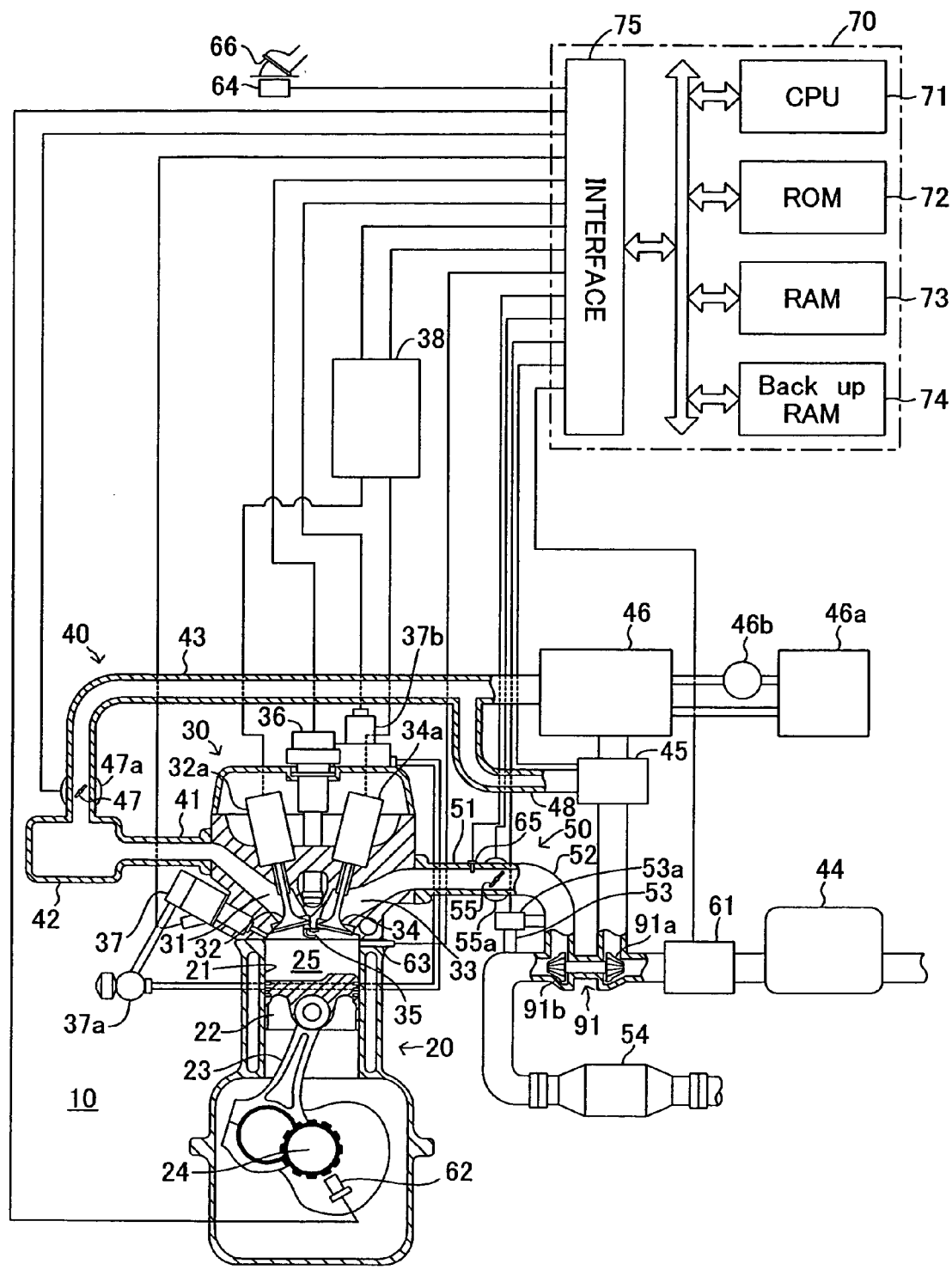
FIG. 1 is a schematic diagram showing a system in which a control device according to a first embodiment of the invention is applied to a multi-cylinder 4-cycle homogeneous charge compression ignition-type internal combustion engine.

Referring to the drawings, each embodiment of the control device of a homogeneous charge compression ignition-type internal combustion engine according to the invention will be described below. FIG. 1 shows the schematic configuration of a system in which the control device according to the first embodiment is applied to a multi-cylinder 4-cycle homogeneous charge compression ignition-type internal combustion engine having three cylinders. Although FIG. 1 shows only the section of a specific cylinder, the other cylinders also have the similar configuration.

The internal combustion engine 10 includes a cylinder block section 20 including a cylinder block, a cylinder block lower-case, and an oil pan, a cylinder head section 30 fixed on the cylinder block section 20, an intake system 40 for supplying air to the cylinder block section 20, and an exhaust system 50 for emitting exhaust gas from the cylinder block section 20 to the exterior of the engine 10.

The cylinder block section 20 includes cylinders 21, pistons 22, connecting rods 23 and a crankshaft 24. Each of the pistons 22 reciprocates within the corresponding cylinder 21. The reciprocating motion of the piston 22 is transmitted to the crankshaft 24 via the corresponding connecting rod 23, whereby the crankshaft 24 rotates. The cylinder 21 and a head of the piston 22, together with the cylinder head section 30, form a combustion chamber 25.

The cylinder head section 30 includes an intake port 31 communicating with the combustion chamber 25, an intake valve 32 for opening and closing the intake port 31, an intake valve driving mechanism 32a for driving the intake valve 32, an exhaust port 33 communicating with the combustion chamber 25, an exhaust valve 34 for opening and closing the exhaust port 33, an exhaust valve driving mechanism 34a for driving the exhaust valve 34, a spark plug 35, an igniter 36 including an ignition coil for generating high voltage to be applied to the spark plug 35, an injector 37 for injecting fuel into the combustion chamber 25, an accumulator 37a for supplying high-pressure fuel to the injector 37 and a fuel pump 37b for pressure-feeding fuel to the accumulator 37a. The intake valve driving mechanism 32a and the exhaust valve driving mechanism 34a are connected to a driving circuit 38.

The intake system 40 includes an intake manifold 41 communicating with the intake port 31 and forming an intake path together with the intake port 31, a surge tank 42 communicating with the intake manifold 41, an intake duct 43 one end of which is connected to the surge tank 42, an air filter 44, a compressor 91a of a turbocharger 91, a bypass flow rate regulating valve 45, an inter-cooler 46 and a throttle valve 47. The air filter 44 and the followings are respectively arranged in the intake duct 43 in order from the other end of the intake duct 43 downstream (toward the intake manifold 41).

The intake system 40 further includes a bypass path 48. One end of the bypass path 48 is connected to the bypass flow rate regulating valve 45 and the other end is connected to the intake duct 43 at a position between the inter-cooler 46 and the throttle valve 47. The bypass flow rate regulating valve 45 can regulate (control) the rate of air that flows into the inter-cooler 46 and the rate of air that bypasses the inter-cooler 46 (the airflow rate that flows into the bypass path 48) by changing an opening of a valve not shown in response to a drive signal.

The inter-cooler 46 is a water cooling type and cools air passing the intake duct 43. The inter-cooler 46 is connected to a radiator 46a for emitting the heat of cooling water in the inter-cooler 46 into the air and a circulating pump 46b for circulating cooling water between the inter-cooler 46 and the radiator 46a.

The throttle valve 47 is rotatably supported by the intake duct 43 and the cross-sectional opening area of the intake duct 43 can be varied by the throttle valve 47 being driven by a throttle valve actuator 47a.

The exhaust system 50 includes an exhaust manifold 51 including plural independent passages communicating with exhaust ports 33 of the cylinders respectively and a collecting portion in which exhaust gas flowing through the passages joins together. The exhaust system 50 further includes exhaust pipe 52 communicating with the exhaust manifold 51 on the downstream of the collecting portion of the exhaust manifold 51, a turbine 91b of the turbocharger 91 disposed in the exhaust pipe 52, a waste gate path 53 both ends of which communicate with the exhaust pipe 52 on the upstream and on the downstream of the turbine 91b so that the turbine 91b is bypassed, a boost pressure regulating valve 53a disposed in the waste gate path 53 and a 3-way catalytic converter 54 disposed in the exhaust pipe 52 on the downstream of the turbine 91b.

The exhaust system 50 further includes an exhaust flow rate regulating valve 55. The exhaust flow rate regulating valve 55 is rotatably supported by the exhaust manifold 51 in the collecting portion of the exhaust manifold 51 (or by the exhaust pipe 52 at a position in the vicinity of a connection of the exhaust manifold 51 and the exhaust pipe 52). An opening of the exhaust flow rate regulating valve 55 is controlled when the exhaust flow rate regulating valve 55 is driven by an exhaust flow rate regulating valve actuator 55a and hereby, the cross-sectional opening area of the exhaust path can be varied.

The turbine 91b of the turbocharger 91 is rotated by the energy of exhaust gas, hereby the compressor 91a of the intake system 40 is rotated and compresses air. Hereby, the turbocharger 91 supercharges air into the internal combustion engine 10. The boost pressure regulating valve 53a regulates an amount of exhaust gas flowing into the turbine 91b in response to a drive signal and hereby, pressure (boost pressure) in the intake path can be controlled. The boost pressure is controlled by the boost pressure regulating valve 53a so that the boost pressure is equal to target boost pressure determined by a load (for example, an accelerator pedal stroke Accp) of the internal combustion engine 10 and engine speed NE.

Figure 2:
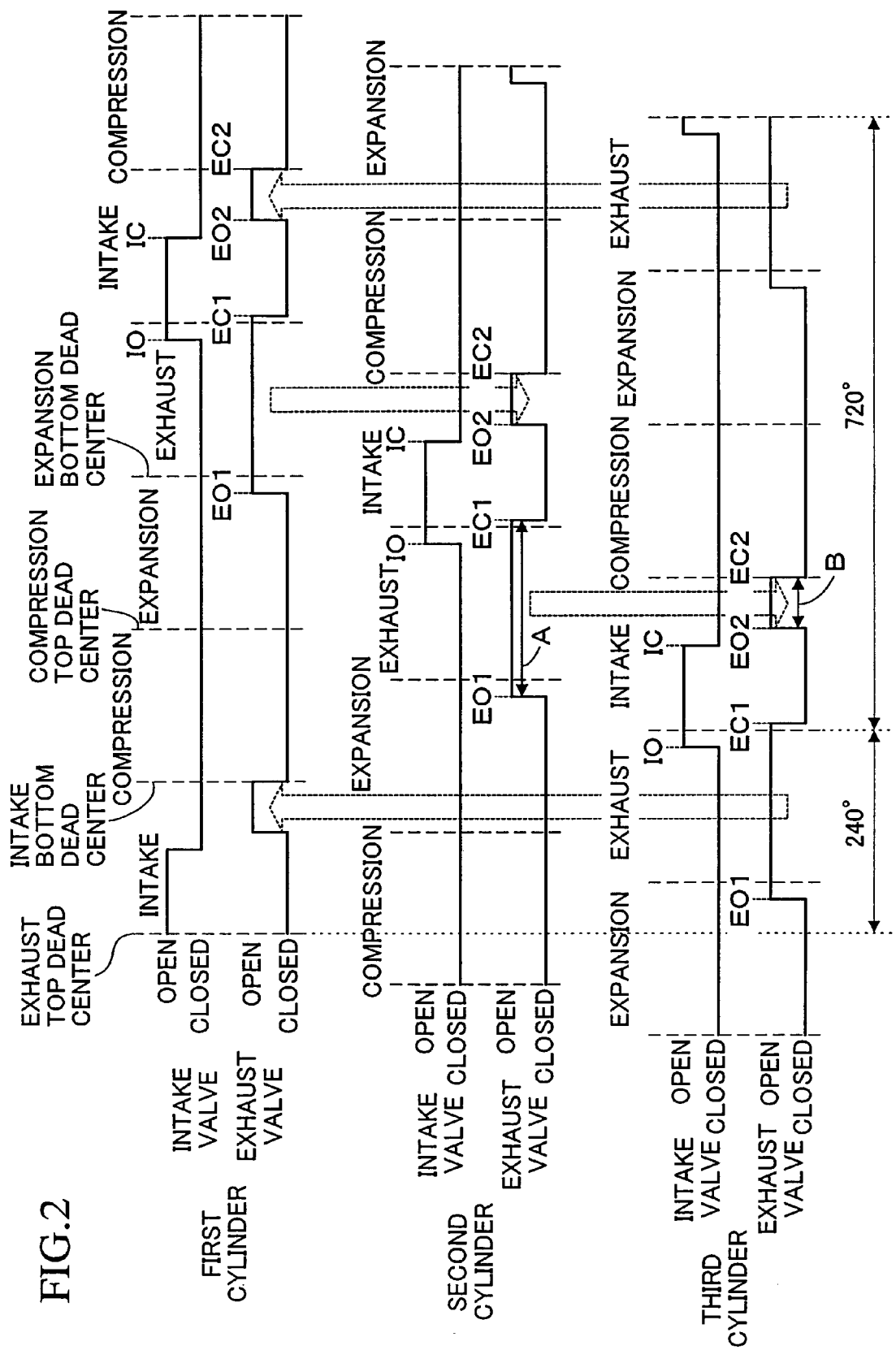
FIG. 2 shows the timing of strokes of each cylinder and the timings for opening and closing an intake valve and an exhaust valve of each cylinder.

As described above, the internal combustion engine 10 is a 4-cycle internal combustion engine. One combustion cycle of the 4-cycle internal combustion engine includes four strokes of an intake stroke, a compression stroke, an expansion stroke and an exhaust stroke as shown in FIG. 2. Each stroke is a stroke of 180 degrees as a crank angle from a top dead center (TDC) to a bottom dead center (BDC) or from the bottom dead center to the top dead center.

The intake stroke is a stroke from an exhaust top dead center to an intake bottom dead center. Mainly in the intake stroke air is taken into the combustion chamber 25. The compression stroke is a stroke from the intake bottom dead center to a compression top dead center. Mainly in the compression stroke air-fuel mixture in the combustion chamber 25 is compressed. The expansion stroke is a stroke from the compression top dead center to an expansion bottom dead center. Mainly in the expansion stroke combustion gas generated by the combustion of the air-fuel mixture expands in the combustion chamber 25. The exhaust stroke is a stroke from the expansion bottom dead center to the exhaust top dead center. Mainly in the exhaust stroke the combustion gas is exhausted from the combustion chamber 25. The above-mentioned combustion cycles are repeated in the three cylinders every time the crankshaft 24 rotates by 720 degrees.

The internal combustion engine 10 is configured so that any two cylinders successively reaching the exhaust top dead center have the same phase difference of crank angle between them. Ignition order in this embodiment is in the order of a first cylinder, a third cylinder and a second cylinder. There is a lag of 240 degrees of crank angle from the moment when the crank angle of the first cylinder is the exhaust top dead center to the moment when the crank angle of the third cylinder is the exhaust top dead center. There is also a lag of 240 degrees of crank angle from the moment when the crank angle of the third cylinder is the exhaust top dead center to the moment when the crank angle of the second cylinder is the exhaust top dead center. There is also a lag of 240 degrees of crank angle from the moment when the crank angle of the second cylinder is the exhaust top dead center to the moment when the crank angle of the first cylinder is the exhaust top dead center.

Referring to FIG. 1 again, this system includes an air flowmeter 61, a crank position sensor 62, a cylinder pressure sensor 63, an accelerator opening sensor 64 and a temperature sensor 65 as combustion gas temperature obtaining means. The air flowmeter 61 outputs a signal representing an amount of taken air. The crank position sensor 62 outputs a signal having a narrow pulse every time the crankshaft 24 rotates by 10 degrees and having a wide pulse every time the crankshaft 24 rotates by 360 degrees. This signal represents the engine speed NE. The cylinder pressure sensor 63 outputs a signal representing pressure (cylinder pressure) P in the combustion chamber 25. The accelerator opening sensor 64 outputs a signal representing the accelerator pedal stroke Accp of an accelerator pedal 66 operated by a driver. The temperature sensor 65 is disposed in the exhaust manifold 51 in the collecting portion of the exhaust manifold 51 and on the upstream of the exhaust flow rate regulating valve 55 (or in the exhaust pipe 52 at a position in the vicinity of a connection of the exhaust manifold 51 and the exhaust pipe 52 and on the upstream of the exhaust flow rate regulating valve 55). The temperature sensor 65 outputs a signal representing the temperature T of the combustion gas.

An electric control device 70 is a microcomputer including a CPU 71, a ROM 72 that stores in advance programs for the CPU 71 to execute, tables (lookup tables and maps), constants and others, a RAM 73 for the CPU 71 to temporarily store data if necessary, backup RAM 74 that stores data in a state in which power is turned on and also holds the stored data while power is turned off and an interface 75 including AD converters, which are mutually connected via a bus. The interface 75 is connected to the above-mentioned sensors 61 to 65, supplies signals from the sensors 61 to 65 to the CPU 71, and sends a drive signal to the igniter 36, the injector 37, the fuel pump 37b, the driving circuit 38, the bypass flow rate regulating valve 45, the throttle valve actuator 47a, the boost pressure regulating valve 53a and the exhaust flow rate regulating valve actuator 55a according to an instruction of the CPU 71.

(Summary of Operation)

Next, the outline of the operation of the control device configured as above will be described. The control device opens and closes the intake valve 32 and the exhaust valve 34 respectively in each cylinder at appropriate timings and controls the opening of the exhaust flow rate regulating valve 55 disposed in the collecting portion of the exhaust path. Hereby, since air and combustion gas respectively of a desired amount can be taken into the combustion chamber 25, stable combustion by self ignition in a wider operating range can be achieved. In addition, the control device controls the opening of the exhaust flow rate regulating valve 55 in accordance with the temperature of the combustion gas exhausted from the combustion chamber 25. Hereby, more stable combustion by self ignition can be achieved.

Figure 3:
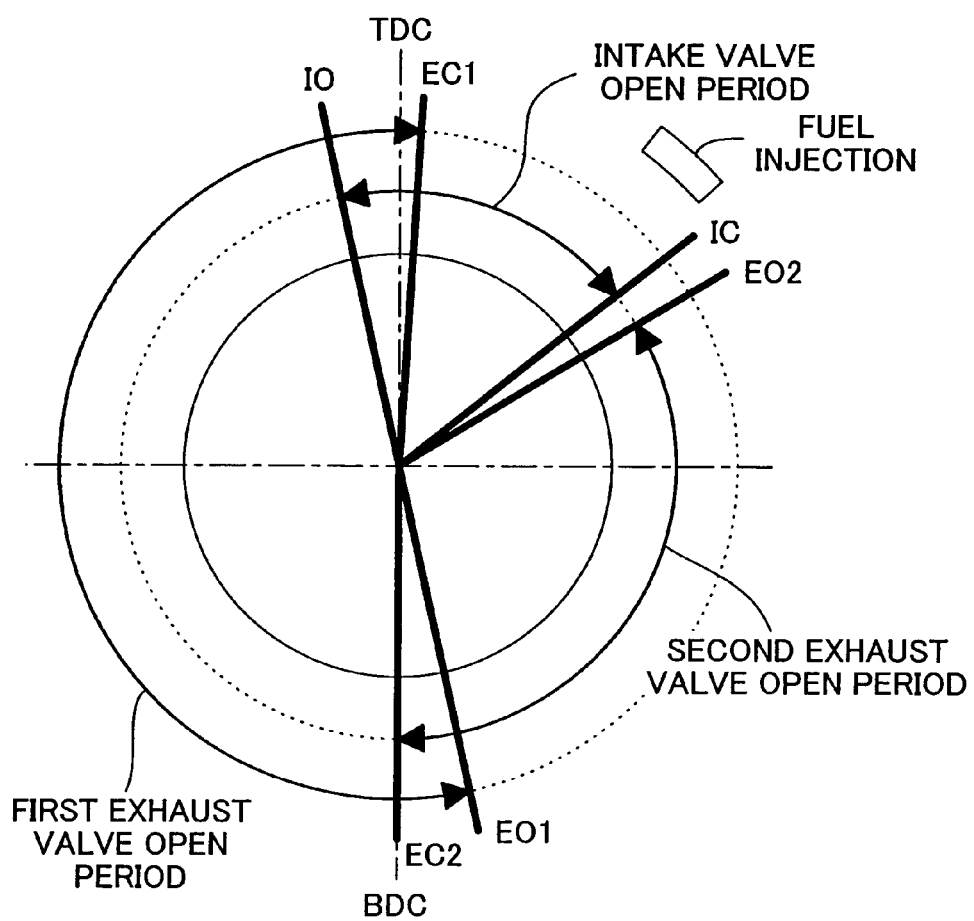
FIG. 3 is an explanatory drawing schematically showing the valve opening/closing timings of one of the plural cylinders in the internal combustion engine shown in FIG. 1.

To explain more concretely, the control device opens and closes the intake valve 32 and the exhaust valve 34 at the valve opening/closing timings shown in FIG. 3. Each cylinder has an intake valve open period in which the intake valve 32 is open and first and second exhaust valve open periods in which the exhaust valve 34 is open in one combustion cycle in accordance with the valve opening/closing timings.

The first exhaust valve open period starts when the control device opens the exhaust valve 34 at a predetermined crank angle in the vicinity of the expansion bottom dead center (at a first exhaust valve opening timing EO1) and ends when the control device closes the exhaust valve 34 at a predetermined crank angle after the exhaust top dead center (at a first exhaust valve closing timing EC1). In the first exhaust valve open period, high-temperature combustion gas is exhausted from the combustion chamber 25 to the exhaust port 33.

The intake valve open period starts when the control device opens the intake valve 32 at a predetermined crank angle before the exhaust top dead center (at an intake valve opening timing IO) and ends when the control device closes the intake valve 32 at a predetermined crank angle before the intake bottom dead center (at an intake valve closing timing IC). In the intake valve open period, low-temperature air (new air) is taken from the intake port 31 into the combustion chamber 25. Further, when a crank angle matches the predetermined crank angle after the exhaust top dead center in the intake valve open period, fuel is injected into the combustion chamber 25.

The second exhaust valve open period starts when the control device opens the exhaust valve 34 at a predetermined crank angle between the intake valve closing timing IC and the intake bottom dead center (at a second exhaust valve opening timing EO2) and ends when the control device closes the exhaust valve 34 at a predetermined crank angle in the vicinity of the intake bottom dead center (at a second exhaust valve closing timing EC2). As described later, in the second exhaust valve open period, high-temperature combustion gas is taken from the exhaust port 33 into the combustion chamber 25. After the second exhaust valve open period ends, the compression of air-fuel mixture starts. When a crank angle is in the vicinity of the compression top dead center, the air-fuel mixture is ignited by itself (begins to burn by itself). Hereby, the air-fuel mixture is combusted and combustion gas is generated.

As the control device opens or closes the intake valve 32 and the exhaust valve 34 respectively of each cylinder at such timings, the first exhaust valve open period (the period shown by an arrow A in FIG. 2) of the second cylinder as shown in FIG. 2 includes the second exhaust valve open period (the period shown by an arrow B in FIG. 2) of the third cylinder. Similarly, the first exhaust valve open period of the first cylinder includes the second exhaust valve open period of the second cylinder and the first exhaust valve open period of the third cylinder includes the second exhaust valve open period of the first cylinder.

Figure 4:
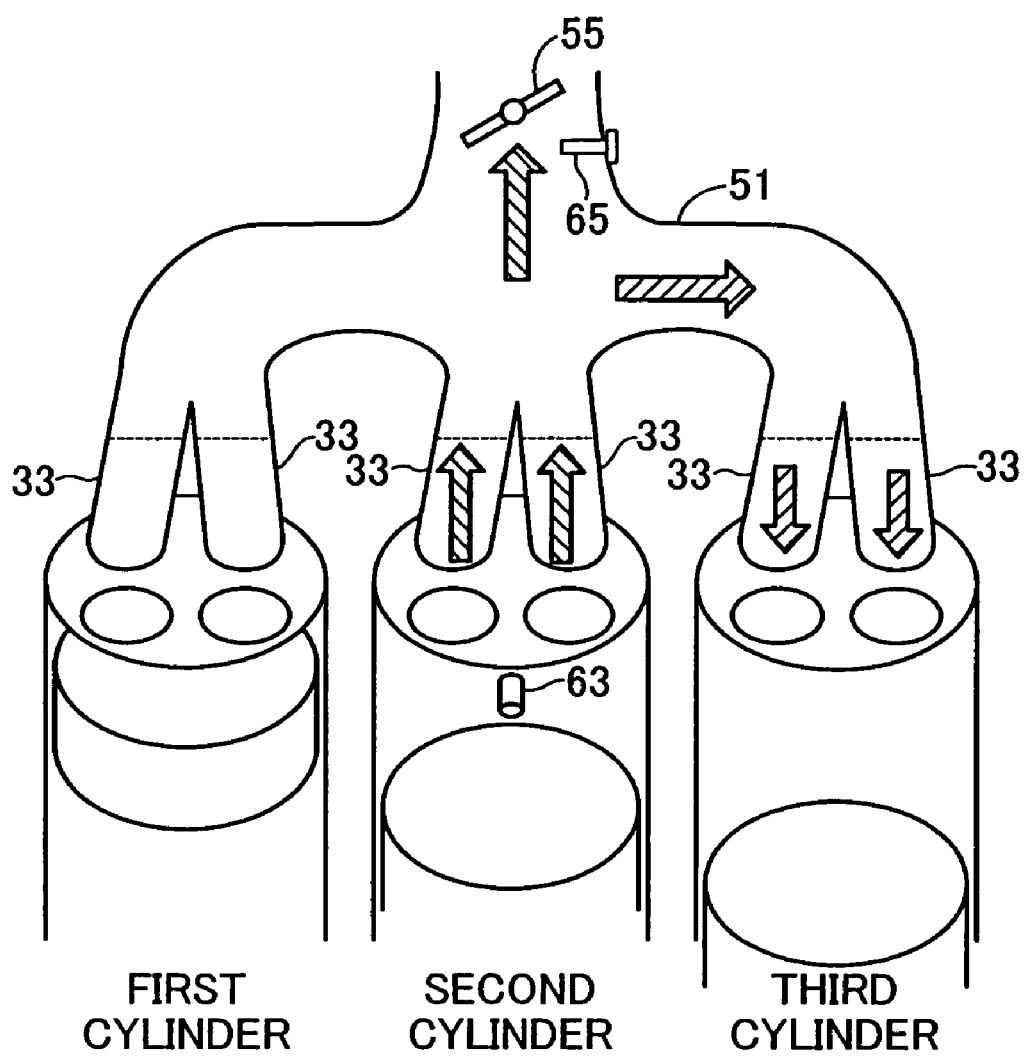
FIG. 4 is an explanatory drawing schematically showing the flow of combustion gas when the combustion gas pushed out of a combustion chamber of a second cylinder is pushed into a combustion chamber of a third cylinder.

Therefore, as schematically shown in FIG. 4, for example, in a period in which the first exhaust valve open period of the second cylinder and the second exhaust valve open period of the third cylinder overlap each other, part of combustion gas pushed out of the combustion chamber 25 of the second cylinder flows in the exhaust port 33 of the second cylinder, the exhaust manifold 51 and the exhaust port 33 of the third cylinder in this order and is pushed into the combustion chamber 25 of the third cylinder. Similarly, part of combustion gas pushed out of the combustion chamber 25 of the first cylinder is pushed into the combustion chamber 25 of the second cylinder and part of combustion gas pushed out of the combustion chamber 25 of the third cylinder is pushed into the combustion chamber 25 of the first cylinder.

As described above, this control device operates to push combustion gas exhausted from the certain cylinder into another cylinder. The summary of the operation of the control device has been described. The actual operation of the electric control device 70 (CPU 71) will be described below.

(Determining Timing to Control Intake Valve and Exhaust Valve)

Figure 5:
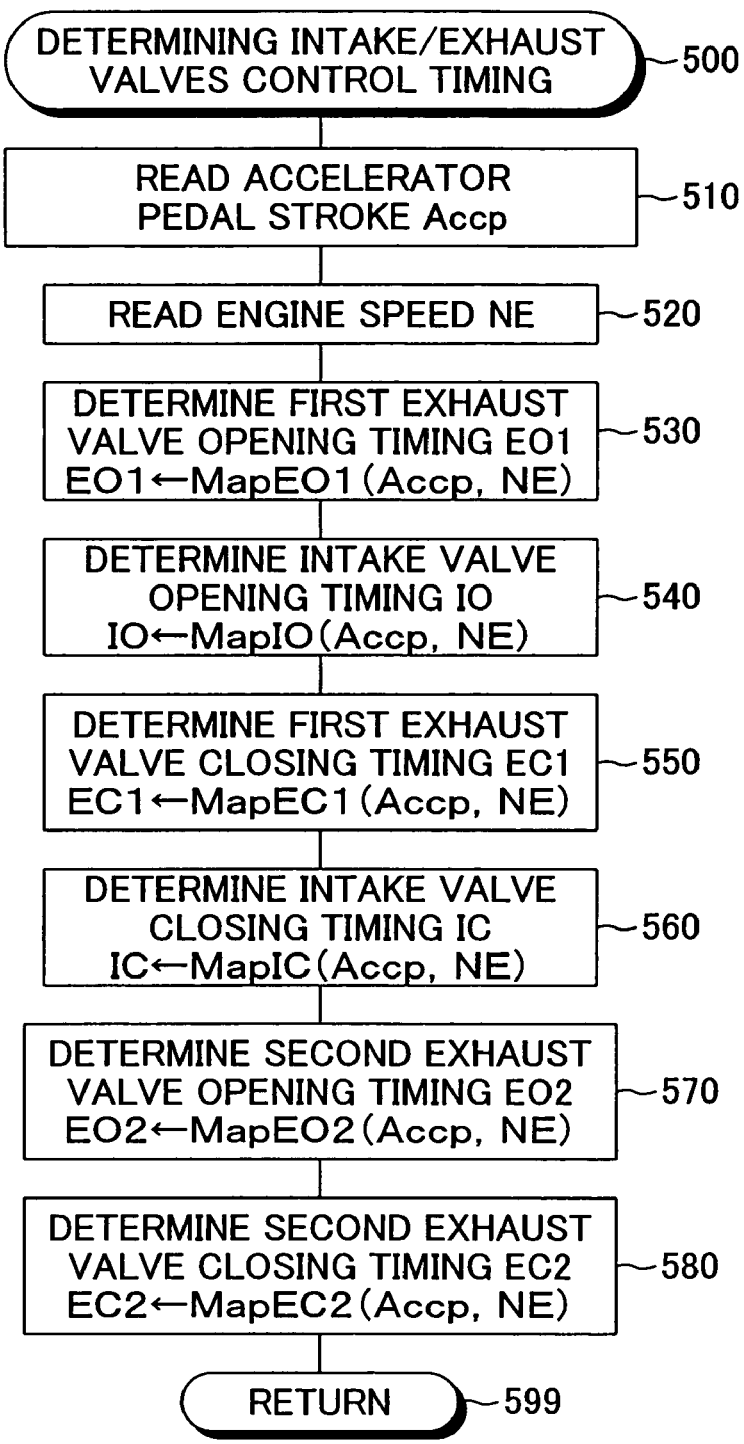
FIG. 5 is a flowchart showing a routine executed by a CPU shown in FIG. 1 for determining the timings at which the intake valve and the exhaust valve are controlled.

The CPU 71 executes an intake and exhaust valves control timing determination routine shown in the flowchart in FIG. 5 for determining timings to control the intake valve 32 and the exhaust valve 34 only for an nth (n: 1, 2 or 3) cylinder every time a crank angle of the nth cylinder is equal to the compression top dead center of the nth cylinder.

When the crank angle of the nth cylinder is equal to the compression top dead center of the nth cylinder, the CPU 71 initiates a process from Step 500, in Step 510, reads an accelerator pedal stroke Accp, and reads engine speed NE in Step 520. The accelerator pedal stroke Accp and the engine speed NE represent operational state of the internal combustion ending 10. Next, in Step 530, the CPU 71 determines the first exhaust valve opening timing EO1 (=MapEO1(Accp, NE)) based upon the current accelerator pedal stroke Accp, the current engine speed NE and a table MapEO1 defining relation among the accelerator pedal stroke Accp, the engine speed NE and the first exhaust valve opening timing EO1. The table MapEO1 is preset so that the obtained first exhaust valve opening timing EO1 is equal to a predetermined timing before the expansion bottom dead center.

In the following description, a table described as MapX(a, b) means a table that defines relation among a variable a, a variable b and a value X. Calculating the value X based upon the table MapX(a,b) means calculating (determining) the value X based upon the current variable a, the current variable b and the table MapX(a,b).

Next, in Step 540, the CPU 71 calculates the intake valve opening timing IO based upon a table MapIO(Accp, NE), and in Step 550, CPU calculates the first exhaust valve closing timing EC1 based upon a table MapEC1 (Accp, NE). Next, in Step 560, the CPU 71 calculates the intake valve closing timing IC based upon a table MapIC(Accp, NE). The table MapIO is preset so that the intake valve opening timing IO is equal to a predetermined timing before the exhaust top dead center. The table MapIC is preset so that the intake valve closing timing IC is equal to a predetermined timing between the exhaust top dead center and the intake bottom dead center. Further, the table MapEC1 is preset so that in the same operational state, the first exhaust valve closing timing EC1 obtained based upon the table MapEC1 is equal to a predetermined timing earlier than the intake valve closing timing IC obtained based upon the table MapIC.

Next, in Step 570, the CPU 71 obtains the second exhaust valve opening timing EO2 from a table MapEO2(Accp, NE) and in Step 580, obtains the second exhaust valve closing timing EC2 from a table MapEC2(Accp, NE). The table MapEO2 is preset so that in the same operational state, the second exhaust valve opening timing EO2 obtained based upon the table MapEO2 is equal to a predetermined timing later than the intake valve closing timing IC obtained based upon the table MapIC. The table MapEC2 is preset so that the second exhaust valve closing timing EC2 is equal to a predetermined timing in the vicinity of the intake bottom dead center. In Step 599, the CPU 71 once finishes this routine. Thereby, the timings to control the intake valve 32 and the exhaust valve 34 of each cylinder are determined.

(Control for Driving Intake Valve and Exhaust Valve)

Figure 6:
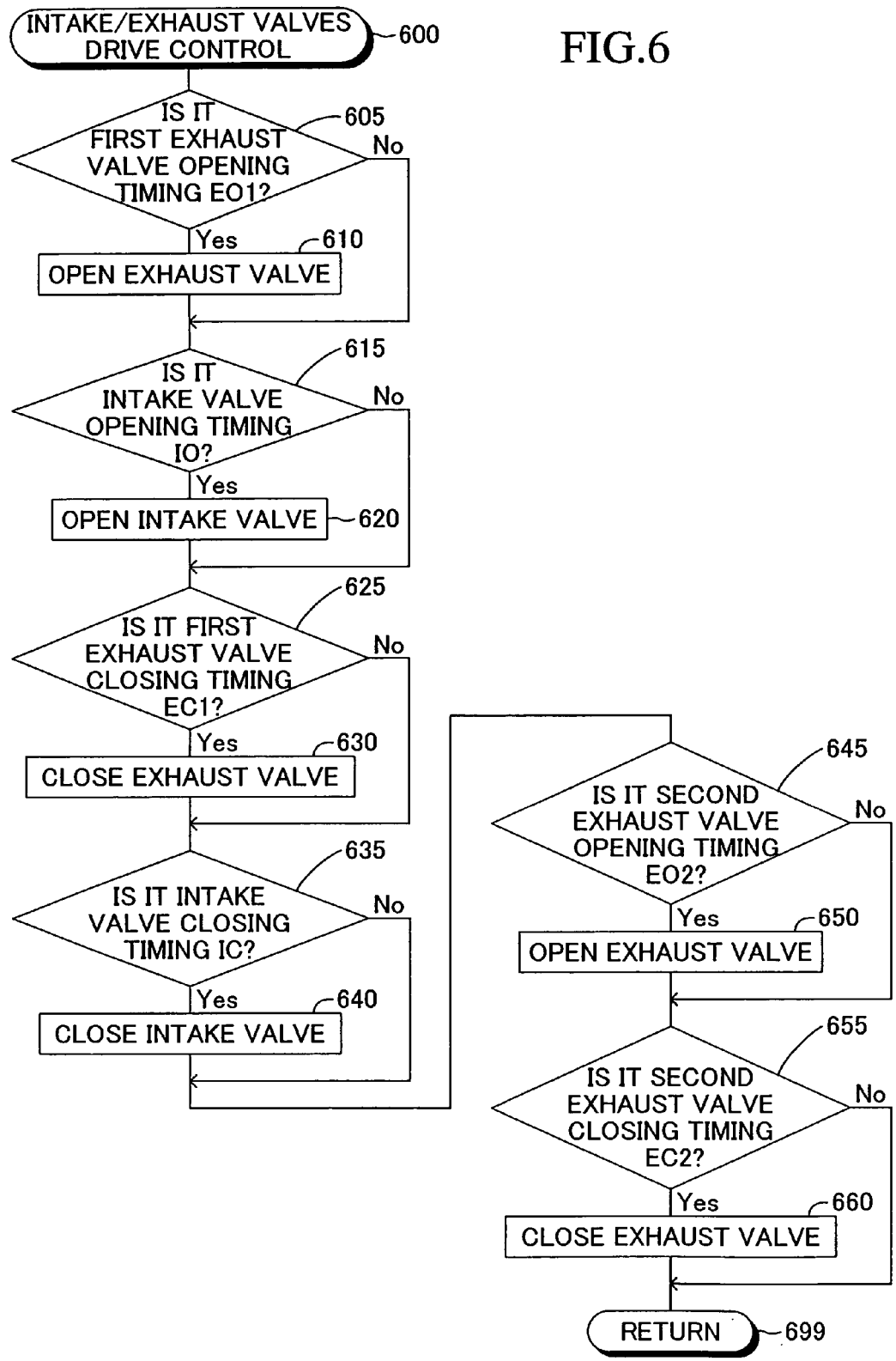
FIG. 6 is a flowchart showing a routine executed by the CPU shown in FIG. 1 for controlling the drive of the intake valve and the exhaust valve.

Further, the CPU 71 executes an intake/exhaust valves drive control routine for controlling the drive of the intake valve 32 and the exhaust valve 34 shown in a flowchart in FIG. 6 for only the nth cylinder every time a crank angle progresses by a predetermined minute crank angle. Therefore, at a predetermined timing, the CPU 71 initiates a process of this routine from Step 600 and determines in Step 605 whether or not the current crank angle of the nth cylinder matches the first exhaust valve opening timing EO1 of the nth cylinder determined in Step 530 shown in FIG. 5. When the current crank angle of the nth cylinder matches the first exhaust valve opening timing EO1 of the nth cylinder, the CPU 71 determines that the answer in Step 605 is "Yes" and, in Step 610, sends a drive signal for opening the exhaust valve 34 to the driving circuit 38. Hereby, the exhaust valve driving mechanism 34a is operated and the exhaust valve 34 of the nth cylinder is opened. The execution of the processing in Steps 605 and 610 in addition to the processing in Step 530 shown in FIG. 5 corresponds to the achievement of part of the functions of the first exhaust valve control means.

Afterward, the CPU 71 executes various operations described below by generating various drive signals at appropriate timings according to processing in Steps 615 to 660 as in the case that the exhaust valve 34 is opened.

When in Steps 615 and 620, the current crank angle of the nth cylinder matches the intake valve opening timing IO of the nth cylinder determined in Step 540 shown in FIG. 5, a drive signal for opening the intake valve 32 is sent to the driving circuit 38 and the intake valve 32 of the nth cylinder is opened by the operation of the intake valve driving mechanism 32a. The execution of the processing in Steps 615 and 620 in addition to the processing in Step 540 shown in FIG. 5 corresponds to the achievement of part of the functions of the intake valve control means.

When in Steps 625 and 630, the current crank angle of the nth cylinder matches the first exhaust valve closing timing EC1 of the nth cylinder determined in Step 550 shown in FIG. 5, a drive signal for closing the exhaust valve 34 is sent to the driving circuit 38 and the exhaust valve 34 of the nth cylinder is closed by the operation of the exhaust valve driving mechanism 34a. The execution of the processing in Steps 625 and 630 in addition to the processing in Step 550 shown in FIG. 5 corresponds to the achievement of part of the functions of the first exhaust valve control means.

When in Steps 635 and 640, the current crank angle of the nth cylinder matches the intake valve closing timing IC of the nth cylinder determined in Step 560 shown in FIG. 5, a drive signal for closing the intake valve 32 is sent to the driving circuit 38 and the intake valve 32 of the nth cylinder is closed by the operation of the intake valve driving mechanism 32a. The execution of the processing in Steps 635 and 640 in addition to the processing in Step 560 shown in FIG. 5 corresponds to the achievement of part of the functions of the intake valve control means.

When in Steps 645 and 650, the current crank angle of the nth cylinder matches the second exhaust valve opening timing EO2 of the nth cylinder determined in Step 570 shown in FIG. 5, a drive signal for opening the exhaust valve 34 is sent to the driving circuit 38 and the exhaust valve 34 of the nth cylinder is opened by the operation of the exhaust valve driving mechanism 34a. The execution of the processing in Steps 645 and 650 in addition to the processing in Step 570 shown in FIG. 5 corresponds to the achievement of part of the functions of the second exhaust valve control means.

When in Steps 655 and 660, the current crank angle of the nth cylinder matches the second exhaust valve closing timing EC2 of the nth cylinder determined in Step 580 shown in FIG. 5, a drive signal for closing the exhaust valve 34 is sent to the driving circuit 38 and the exhaust valve 34 of the nth cylinder is closed by the operation of the exhaust valve driving mechanism 34a. The execution of the processing in Steps 655 and 660 in addition to the processing in Step 580 shown in FIG. 5 corresponds to the achievement of part of the functions of the second exhaust valve control means.

After the CPU 71 executes these processings, it once finishes this routine in Step 699. Thereby, the intake valve 32 and the exhaust valve 34 of each cylinder are opened and closed at the timings determined in the routine shown in FIG. 5.

(Control of Exhaust Flow Rate Regulating Valve)

Further, the control device controls the exhaust flow rate regulating valve 55. The control of the exhaust flow rate regulating valve 55 is achieved when the CPU 71 executes an exhaust flow rate regulating valve control routine shown in the flowchart in FIG. 7 every time a crank angle in one specific cylinder matches its compression top dead center. The execution of the exhaust flow rate regulating valve control routine corresponds to the achievement of the function of the exhaust flow rate regulating valve control means.

Therefore, at a predetermined timing, the CPU 71 initiates a process of this routine from Step 700, reads an accelerator pedal stroke Accp in Step 710, and reads engine speed NE in Step 720. Next, the CPU 71 obtains a target exhaust flow rate regulating valve opening Vtgt which is a target value of the opening of the exhaust flow rate regulating valve 55 from a table MapVtgt(Accp, NE) in Step 730. The table MapVtgt is preset so that as a load increases or as engine speed increases, the target exhaust flow rate regulating valve opening Vtgt increases.

The reason is as follows. As the load increases or as the engine speed increases, an amount of combustion gas generated in the combustion chamber 25 per unit time increases. Accordingly, the pressure in the exhaust path on the upstream side of the exhaust flow rate regulating valve 55 increases and an amount of combustion gas pushed into the combustion chamber 25 increases. Therefore, it is desirable that the pressure in the exhaust path on the upstream side of the exhaust flow rate regulating valve 55 is appropriately decreased by increasing the opening of the exhaust flow rate regulating valve 55. Consequently, the amount of the combustion gas pushed into the combustion chamber 25 can be a desired amount according to the operational state.

Next, in Step 740, the CPU 71 reads the temperature T of the combustion gas from a signal output from the temperature sensor 65. The CPU 71 obtains, from a table MapTref(Accp, NE) in Step 750, a reference combustion gas temperature Tref which is a reference value of the temperature of the combustion gas and obtains an exhaust flow rate regulating valve opening correction coefficient K which is a coefficient used to correct the target exhaust flow rate regulating valve opening Vtgt from a table MapK(Accp, NE) in Step 760. In this case, the exhaust flow rate regulating valve opening correction coefficient K is a positive value.

Next, in Step 770, the CPU 71 calculates a correction amount to be added to the target exhaust flow rate regulating valve opening Vtgt by multiplying difference between the temperature T of the combustion gas and the determined reference combustion gas temperature Tref by the determined exhaust flow rate regulating valve opening correction coefficient K and replaces the target exhaust flow rate regulating valve opening Vtgt with a value obtained by adding the calculated correction amount to the target exhaust flow rate regulating valve opening Vtgt. Therefore, when the temperature T of the combustion gas is lower than the reference combustion gas temperature Tref, the target exhaust flow rate regulating valve opening Vtgt is decreased and when it is higher, the target exhaust flow rate regulating valve opening Vtgt is increased.

In Step 780, the CPU 71 sends a drive signal for controlling the opening of the exhaust flow rate regulating valve 55 to the exhaust flow rate regulating valve actuator 55a via the interface 75. Hereby, the exhaust flow rate regulating valve 55 is driven by the exhaust flow rate regulating valve actuator 55a so that the opening is equal to the target exhaust flow rate regulating valve opening Vtgt. Next, in Step 799, the CPU 71 once finishes this routine. Thereby, the opening of the exhaust flow rate regulating valve 55 is controlled according to the operational state of the internal combustion engine 10 and the temperature of the combustion gas.

As described above, in the first embodiment of the control device of the multi-cylinder 4-cycle homogeneous charge compression ignition-type internal combustion engine having three cylinders according to the invention, the intake valve 32 is closed before the intake bottom dead center in each cylinder and afterward, the exhaust valve 34 is opened before the intake bottom dead center. Further, in the first embodiment, the exhaust flow rate regulating valve 55 is disposed in the collecting portion of the exhaust path and the opening of the exhaust flow rate regulating valve 55 is controlled. Hereby, since air and combustion gas respectively of a desired amount can be taken into the combustion chamber 25, stable combustion by self ignition in a wider operating range can be achieved. In addition, as a period in which air is taken into the combustion chamber 25 is short, loss when the air passes the throttle formed by the throttle valve 47 and the intake valve 32 is decreased and the fuel consumption can be reduced.

Further, in the first embodiment, the exhaust valve 34 of each cylinder is opened and closed so that the period since the exhaust valve 34 of one cylinder is opened in the intake stroke until the exhaust valve 34 is closed and the period in which the exhaust valve 34 of another cylinder is open in the exhaust stroke partially overlap each other. Hereby, since combustion gas pushed out of the combustion chamber 25 of another cylinder is pushed into the combustion chamber 25 of the one cylinder via the exhaust path, more of combustion gas can be supplied to the combustion chamber 25.

In addition, in the first embodiment, the opening of the exhaust flow rate regulating valve 55 is controlled according to the obtained operational state. Hereby, since the amount of combustion gas taken into the combustion chamber 25 via the exhaust path can be a desired amount according to the operational state, more stable combustion by self ignition can be achieved.

Further, in the first embodiment, the temperature of combustion gas exhausted from the combustion chamber 25 is obtained and as the obtained temperature of the combustion gas decreases, the opening of the exhaust flow rate regulating valve 55 is decreased. Hereby, since the temperature of air-fuel mixture formed in the combustion chamber 25 can be closer to a desired temperature, more stable combustion by self ignition can be achieved.

Second Embodiment

Next, a control device of a multi-cylinder 4-cycle homogeneous charge compression ignition-type internal combustion engine having three cylinders according to a second embodiment of the invention will be described. The second embodiment is the same as the first embodiment except that a method of correcting a target exhaust flow rate regulating valve opening is different. In the first embodiment, correction is made so that as the temperature of combustion gas decreases, the target exhaust flow rate regulating valve opening is decreased. In the second embodiment, however, the target exhaust flow rate regulating valve opening is corrected so that the ignition timing in specific one cylinder is closer to the reference ignition timing which is a reference value of ignition timing according to operational state. Hereby, more stable combustion by self ignition can be achieved.

The second embodiment will be described below mainly in relation to points different from the first embodiment. In the second embodiment, the CPU 71 executes an exhaust flow rate regulating valve control routine in which processing from Step 850 to Step 870 shown in FIG. 8 is substituted for the processing in Steps 740 to 770 shown in FIG. 7.

Figure 7:
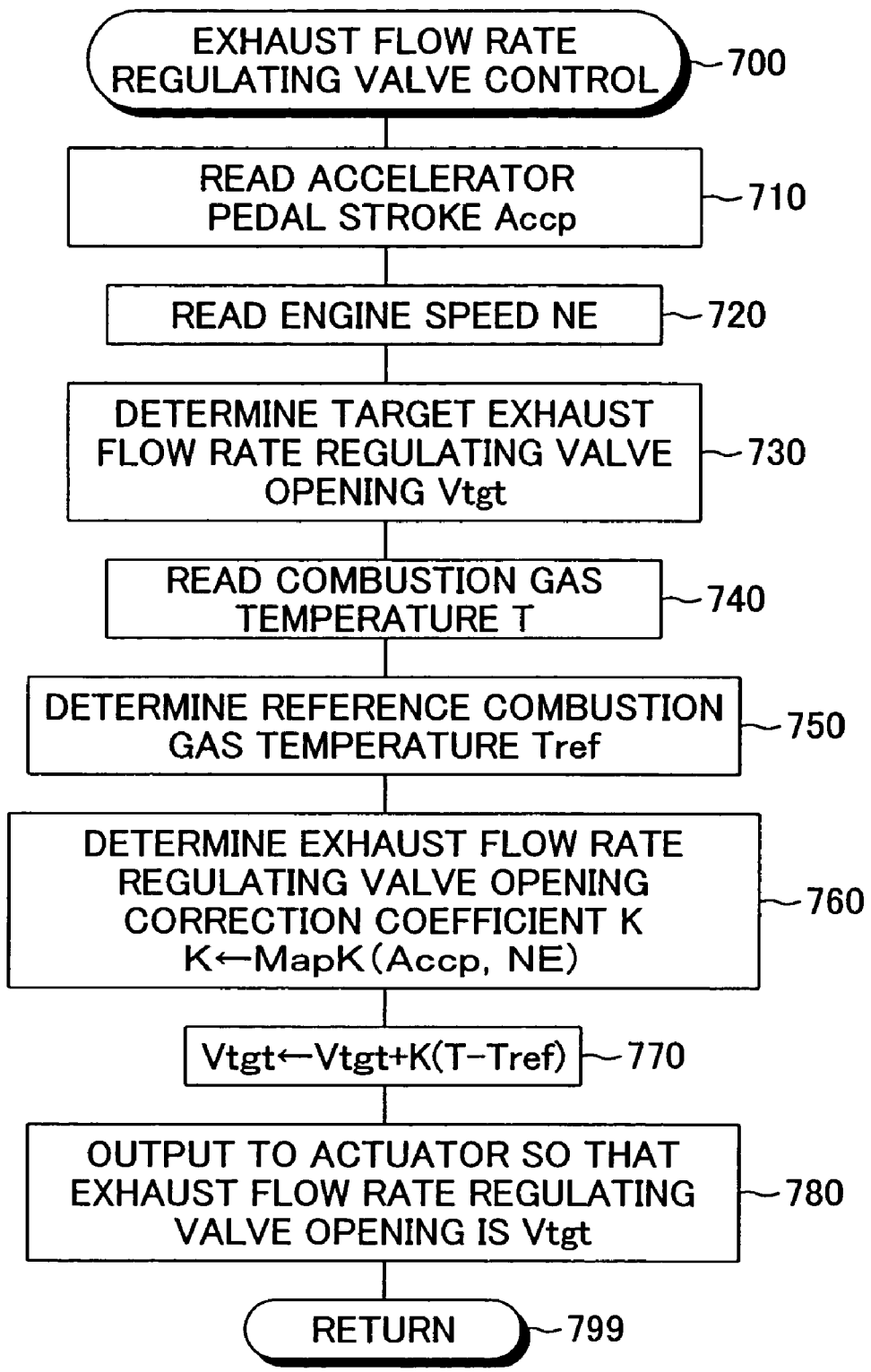
FIG. 7 is a flowchart showing a routine executed by the CPU shown in FIG. 1 for controlling an exhaust flow rate regulating valve based upon the temperature of combustion gas.
Figure 8:
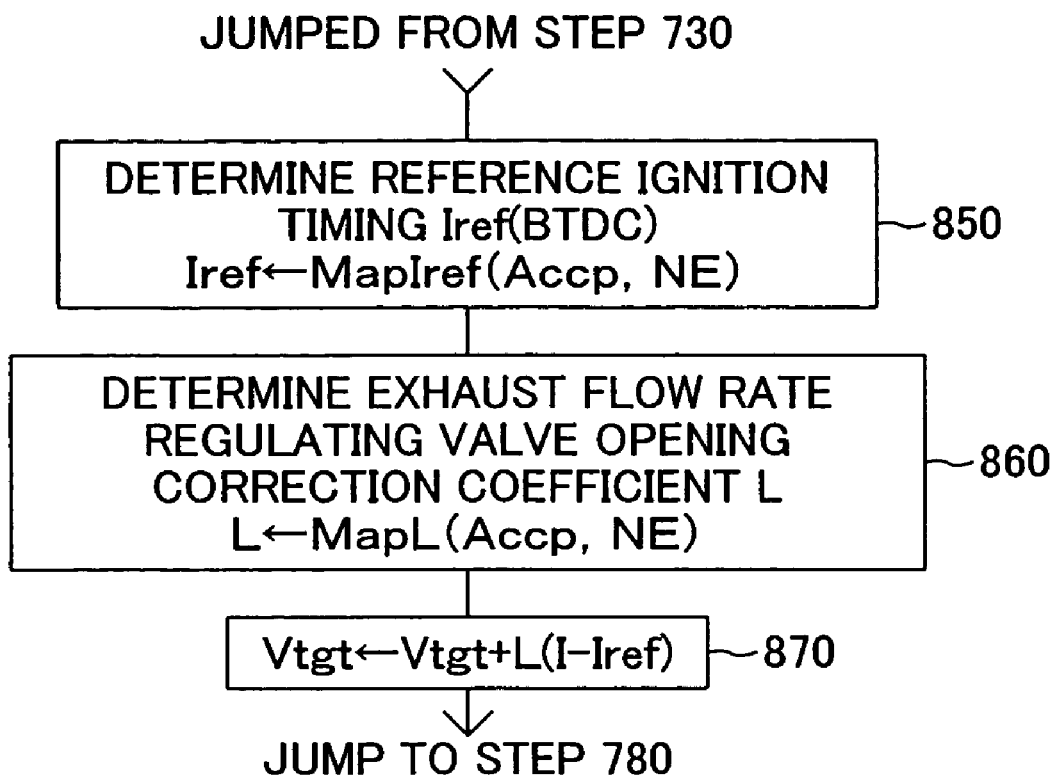
FIG. 8 is a flowchart showing a process executed by the CPU shown in FIG. 1 in place of part of the routine shown in FIG. 7 to control the exhaust flow rate regulating valve based upon the ignition timing.

Suppose that the CPU 71 has executed the processing in Steps 700 to 730 shown in FIG. 7 and the process for determining the target exhaust flow rate regulating valve opening Vtgt is finished. At this time, the CPU 71 obtains the reference ignition timing Iref from a table MapIref(Accp, NE) in Step 850 following Step 730 and obtains an exhaust flow rate regulating valve opening correction coefficient L which is a coefficient used for correcting the target exhaust flow rate regulating valve opening Vtgt from a table MapL(Accp, NE) in Step 860. In this case, the exhaust flow rate regulating valve opening correction coefficient L is a positive value. The reference ignition timing Iref and ignition timing I described later are represented as a crank angle (BTDC) having a top dead center (TDC) as an origin and having positive values in a direction reverse to the rotational direction of a crankshaft 24.

Next, in Step 870, the CPU 71 calculates a correction amount for the target exhaust flow rate regulating valve opening Vtgt by multiplying a difference between the ignition timing of the preceding combustion I estimated in an ignition timing estimation routine shown in FIG. 9 described later and the determined reference ignition timing Iref by the determined exhaust flow rate regulating valve opening correction coefficient L, and replaces the target exhaust flow rate regulating valve opening Vtgt with a value obtained by adding the calculated correction amount to the target exhaust flow rate regulating valve opening Vtgt. Therefore, when the ignition timing I is later than the reference ignition timing Iref, the target exhaust flow rate regulating valve opening Vtgt is decreased and when the ignition timing I is earlier, the target exhaust flow rate regulating valve opening Vtgt is increased.

In Step 780, the CPU 71 sends a drive signal for controlling an opening of an exhaust flow rate regulating valve 55 to an exhaust flow rate regulating valve actuator 55a via an interface 75. Hereby, the exhaust flow rate regulating valve 55 is driven by the exhaust flow rate regulating valve actuator 55a so that the opening is equal to the target exhaust flow rate regulating valve opening Vtgt. Next, the CPU 71 once finishes this routine in Step 799. Thereby, the opening of the exhaust flow rate regulating valve 55 is controlled according to the operational state of the internal combustion engine 10 and the ignition timing.

(Estimation of Ignition Timing)

Figure 10:
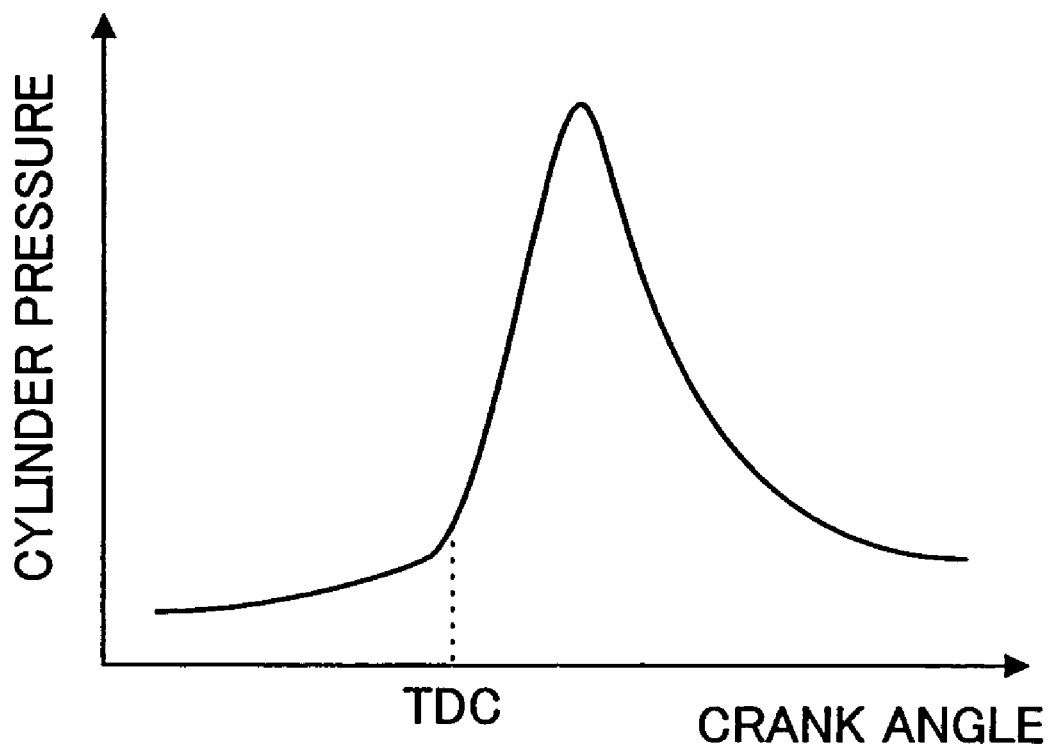
FIG. 10 is a graph schematically showing the temporal variation of pressure in the combustion chamber during a period including the vicinity of ignition timing.

As described above, in this embodiment, the target exhaust flow rate regulating valve opening Vtgt is corrected based upon the ignition timing I of the preceding combustion. The ignition timing is a timing at which air-fuel mixture is ignited in the combustion chamber 25 and combustion starts at this timing. FIG. 10 is a graph schematically showing the temporal variation of cylinder pressure P which is pressure in the combustion chamber 25 in a period including the vicinity of ignition timing. As shown in FIG. 10, as the cylinder pressure P rapidly increases when combustion starts, the ignition timing I can be estimated based upon the temporal variation of the cylinder pressure P.

In the second embodiment, the ignition timing I is estimated to be a timing when a pressure rise ratio Rp that is a ratio of pressure rising in the combustion chamber 25 exceeds a predetermined threshold Rpth. To estimate the ignition timing I as described above, the CPU 71 executes the ignition timing estimation routine shown in the flowchart in FIG. 9 per predetermined minute increase of a crank angle in one specific cylinder. The execution of the ignition timing estimation routine corresponds to the achievement of the function of the ignition timing estimating means. The estimation of the ignition timing I will be described below immediately after an intake bottom dead center in order of time.

Figure 9:
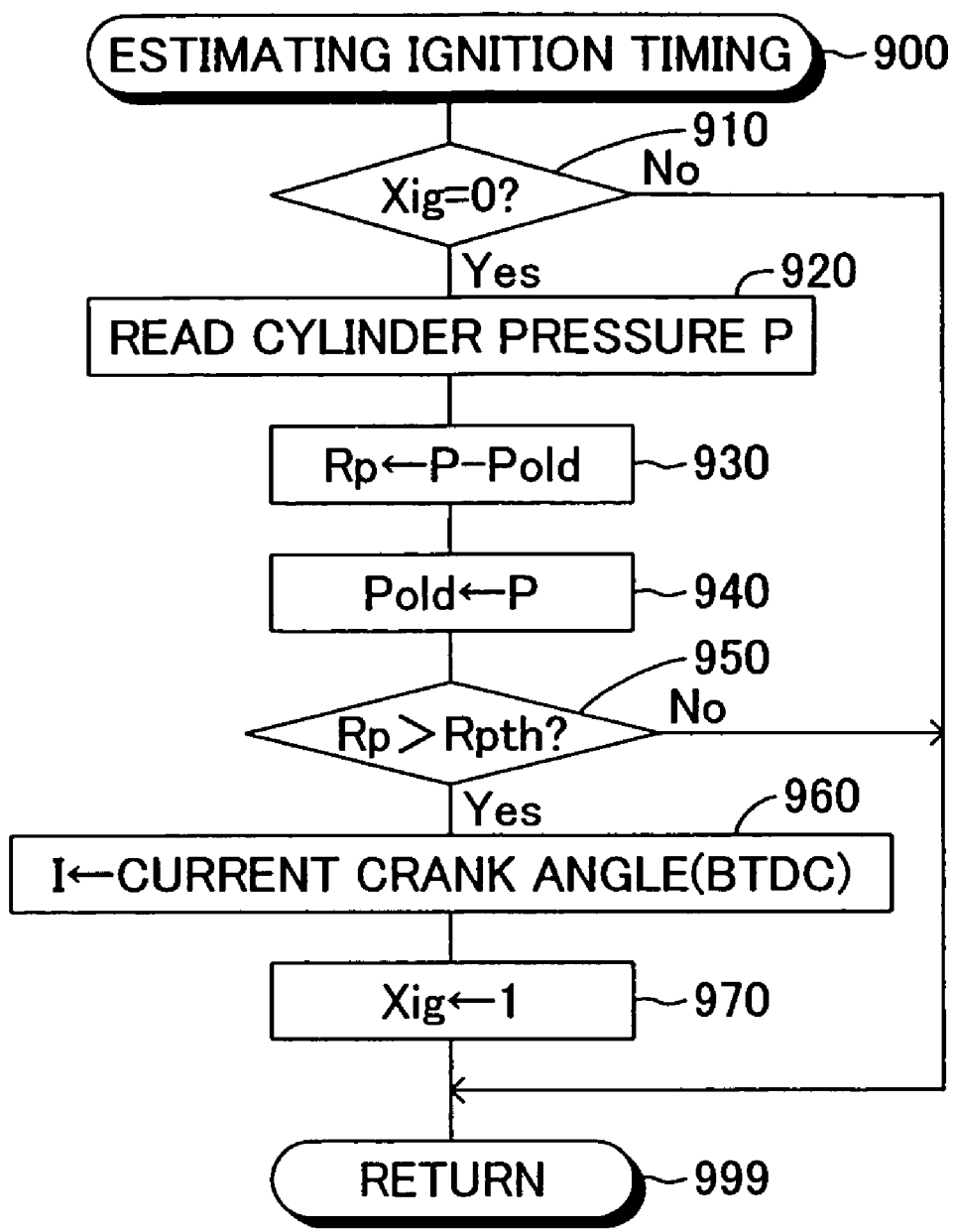
FIG. 9 is a flowchart showing a routine executed by the CPU shown in FIG. 1 for estimating the ignition timing.

The CPU 71 initiates the processing of the ignition timing estimation routine shown in the flowchart in FIG. 9 from Step 900 and determines whether or not a value of ignition timing estimation completion flag Xig is '0' in Step 910. Here, the ignition timing estimation completion flag Xig is a flag showing whether or not the estimation of ignition timing is completed in the current combustion cycle, if the value is '1', the ignition timing is estimated, and if the value is '0', the flag shows that the ignition timing is not estimated yet. A value of the ignition timing estimation completion flag Xig is set to '1' immediately after the ignition timing is estimated in this routine (refer to Step 970 shown in FIG. 9) and when a crank angle is equal to the intake bottom dead center, the value is set to '0' by an interrupt control routine not shown.

Since now is immediately after the intake bottom dead center, the value of the ignition timing estimation completion flag Xig is '0'. Therefore, the CPU 71 determines that the answer in Step 910 is "Yes" and reads the cylinder pressure P from a signal output from the cylinder pressure sensor 63 in Step 920.

Next, in Step 930, the CPU 71 sets pressure rise ratio Rp to a difference between the cylinder pressure P and the past cylinder pressure Pold set in Step 940 described later when this routine is lastly executed. Since this routine is executed for every predetermined minute increase of a crank angle, an amount of change in the cylinder pressure for a predetermined increment of a crank angle is set as the pressure rise ratio Rp. The CPU 71 sets the past cylinder pressure Pold to the cylinder pressure P when this routine is executed in Step 940.

Next, the CPU 71 determines whether or not the pressure rise ratio Rp is larger than the predetermined threshold Rpth of the pressure rise ratio in Step 950. As now is immediately after the intake bottom dead center, air-fuel mixture is not ignited and the pressure rise ratio Rp is equal to or smaller than the threshold Rpth. Therefore, the CPU 71 determines that the answer in Step 950 is "No" and once finishes this routine in Step 999. The above-mentioned process in this routine is repeatedly executed until it is determined that the answer in Step 950 in the routine becomes "Yes". In the meantime, air-fuel mixture in the combustion chamber 25 is compressed.

Afterward, when the temperature of the air-fuel mixture rises, combustion starts. As the combustion progresses, the pressure rise ratio Rp increases and exceeds the threshold Rpth. At this time, when the CPU 71 initiates the process of the ignition timing estimation routine, the CPU 71 determines that the answer in Step 950 is "Yes" and proceeds to Step 960.

Next, the CPU 71 obtains the current crank angle as the ignition timing I in Step 960 and sets the value of the ignition timing estimation completion flag Xig to '1' in Step 970. The CPU 71 once finishes this routine in Step 999. Thereby, the ignition timing I is estimated. Since the value of the ignition timing estimation completion flag Xig is set to '1', the CPU 71 determines that the answer in Step 910 is "No" in Step 910 later and immediately proceeds to Step 999.

Afterward, the estimated ignition timing I is used for correcting the target exhaust flow rate regulating valve opening Vtgt in Step 870 shown in FIG. 8. When time elapses further, a value of the ignition timing estimation completion flag Xig is set to '0' at the intake bottom dead center in the next combustion cycle. Hereby, when the CPU 71 initiates the process of the ignition timing estimation routine, the CPU 71 determines that the answer in Step 910 is "Yes" and proceeds to Step 920 to estimate the ignition timing of the next cycle.

As described above, in the second embodiment, as in the first embodiment, the intake valve 32 is closed before the intake bottom dead center in each cylinder and afterward, the exhaust valve 34 is opened before the intake bottom dead center. Further, in the second embodiment, as in the first embodiment, the exhaust flow rate regulating valve 55 is disposed in the collecting portion of the exhaust path and the opening of the exhaust flow rate regulating valve 55 is controlled. Hereby, as air and combustion gas respectively of a desired amount can be taken into the combustion chamber 25, stable combustion by self ignition in a wider operating range can be achieved. As a period in which air is taken into the combustion chamber 25 is short, loss when the air passes a throttle formed by the throttle valve 47 and the intake valve 32 is decreased and the fuel consumption can be reduced.

Further, in the second embodiment, as in the first embodiment, the exhaust valve 34 of each cylinder is opened and closed so that a period since the exhaust valve 34 of one cylinder is opened in an intake stroke until the exhaust valve is closed and a period in which the exhaust valve 34 of another cylinder is open in an exhaust stroke partially overlap each other. Hereby, since the combustion gas pushed out of the combustion chamber 25 of another cylinder is pushed into the combustion chamber 25 of the one cylinder via the exhaust path, more of the combustion gas can be supplied to the combustion chamber 25.

In addition, in the second embodiment, as in the first embodiment, the opening of the exhaust flow rate regulating valve 55 is controlled according to an obtained operational state. Hereby, since the amount of combustion gas taken into the combustion chamber 25 via the exhaust path can be a desired amount according to the operational state, more stable combustion by self ignition can be achieved.

Further, in the second embodiment, the ignition timing is estimated based upon a ratio of pressure rising in the combustion chamber 25 and when the estimated ignition timing is later than the reference ignition timing according to obtained operational state, the opening of the exhaust flow rate regulating valve 55 is decreased. Hereby, since the combustion gas taken into the combustion chamber 25 can be increased, the temperature of air-fuel mixture formed in the combustion chamber 25 can be increased. Therefore, the ignition timing of the next combustion can be earlier. In the meantime, in the second embodiment, when the estimated ignition timing is earlier than the reference ignition timing according to obtained operational state, the opening of the exhaust flow rate regulating valve 55 is increased. Hereby, since the combustion gas taken into the combustion chamber 25 can be decreased, the temperature of air-fuel mixture formed in the combustion chamber 25 can be lowered. Therefore, the ignition timing of the next combustion can be retarded. Thereby, the ignition timing can be closer to a reference value of the ignition timing according to the operational state and stable combustion by self ignition can be achieved.

In the second embodiment, the ignition timing is estimated in one specific cylinder and the target exhaust flow rate regulating valve opening is corrected based upon the estimated ignition timing. Alternatively it is possible to estimate the ignition timing in all cylinders, calculate the correction amount based upon the estimated ignition timing in all the cylinders, and correct the target exhaust flow rate regulating valve opening using a mean value of the correction amounts. Hereby, the opening of the exhaust flow rate regulating valve 55 is controlled so that the mean value of the ignition timing in all the cylinders is closer to the reference ignition timing.

The invention is not limited to the embodiments and various modifications may be adopted within the scope of the present invention. For example, the control device according to the invention may also be applied to an internal combustion engine in which stratified air-fuel mixture is formed, compressed and ignited by itself. Alternatively, the control device according to the invention may also be applied to an internal combustion engine having four or more cylinders, or it may also be applied to an internal combustion engine which can be operated by selecting self-ignition combustion and combustion by spark ignition. In addition, the control device according to the present invention may be used for an internal combustion engine that closes the intake valve at a later timing, that is to say, between the intake bottom dead center and the compression top dead center, in part of operating range.

What is claimed is:

1. A control device of a multi-cylinder 4-cycle charge compression ignition-type internal combustion engine having three or more cylinders each of which includes an intake port formed in a cylinder head for supplying air to a combustion chamber, an intake valve for opening and closing the intake port, an exhaust port formed in the cylinder head for exhausting combustion gas in the combustion chamber from the combustion chamber and an exhaust valve for opening and closing the exhaust port, the engine having an exhaust path including a plurality of independent passages communicating with respective exhaust ports of the plurality of cylinders and a collecting portion in which the combustion gas flowing through the passages joins together, wherein four strokes of an intake stroke from an exhaust top dead center to an intake bottom dead center, a compression stroke from the intake bottom dead center to a compression top dead center, an expansion stroke from the compression top dead center to an expansion bottom dead center and an exhaust stroke from the expansion bottom dead center to the exhaust top dead center are repeated in the respective cylinders every time a crankshaft rotates by 720 degrees, a crank angle between the exhaust top dead center of one of the plural cylinders and the exhaust top dead center of another cylinder that reaches its exhaust top dead center immediately after the exhaust top dead center of the one cylinder of the plural cylinders is an angle obtained by dividing 720 degrees by the number of the cylinders, and air-fuel mixture formed in the combustion chamber is compressed in the compression stroke and is ignited by itself, the control device comprising:

an exhaust flow rate regulating valve which is disposed in the collecting portion of the exhaust path and whose opening is controlled so that an amount of the combustion gas exhausted to the exterior of the engine via the collecting portion of the exhaust path is changed by varying a cross-sectional opening area of the collecting portion; and a controller that:

controls the exhaust flow rate regulating valve so that the opening of the exhaust flow rate regulating valve is adjusted;

opens the intake valve at a predetermined intake valve opening timing so that the intake valve is open at least in part of the intake stroke and closes the opened intake valve at an intake valve closing timing before the intake bottom dead center;

opens the exhaust valve at a predetermined first exhaust valve opening timing so that the exhaust valve is open at least in part of the exhaust stroke and closes the opened exhaust valve at a first exhaust valve closing timing before the intake valve closing timing; and opens the exhaust valve at a second exhaust valve opening timing between the intake valve closing timing and the intake bottom dead center and closes the opened exhaust valve at a second exhaust valve closing timing before the compression top dead center.

2. The control device of a multi-cylinder 4-cycle charge compression ignition-type internal combustion engine according to claim 1, wherein the controller:

obtains a temperature of the combustion gas exhausted from the combustion chamber, and controls the exhaust flow rate regulating valve so that as the obtained temperature of the combustion gas decreases, the opening of the exhaust flow rate regulating valve is decreased.

3. The control device of a multi-cylinder 4-cycle charge compression ignition-type internal combustion engine according to claim 1, wherein the controller:

obtains an operational state of the internal combustion engine, estimates an ignition timing of a preceding combustion, and controls the exhaust flow rate regulating valve so that when the estimated ignition timing is later than a reference value of ignition timing according to the obtained operational state, the opening of the exhaust flow rate regulating valve is decreased and when the estimated ignition timing is earlier than the reference value, the opening of the exhaust flow rate regulating valve is increased.

4. The control device of a multi-cylinder 4-cycle charge compression ignition-type internal combustion engine according to claim 1, wherein the controller:

obtains an operational state of the internal combustion engine, and controls the exhaust flow rate regulating valve so that the opening of the exhaust flow rate regulating valve is controlled according to the obtained operational state.

5. The control device of a multi-cylinder 4-cycle charge compression ignition-type internal combustion engine according to claim 4, wherein the controller:

obtains a temperature of the combustion gas exhausted from the combustion chamber, and controls the exhaust flow rate regulating valve so that as the obtained temperature of the combustion gas decreases, the opening of the exhaust flow rate regulating valve is decreased.

6. The control device of a multi-cylinder 4-cycle charge compression ignition-type internal combustion engine according to claim 1, wherein:

the controller sets the first exhaust valve opening timing, the first exhaust valve closing timing, the second exhaust valve opening timing and the second exhaust valve closing timing so that a period in which the exhaust valve of one of the cylinders is open and a period in which the exhaust valve of another cylinder of the plurality is open partially overlap each other.

7. The control device of a multi-cylinder 4-cycle charge compression ignition-type internal combustion engine according to claim 6, wherein the controller:

obtains a temperature of the combustion gas exhausted from the combustion chamber, and controls the exhaust flow rate regulating valve so that as the obtained temperature of the combustion gas decreases, the opening of the exhaust flow rate regulating valve is decreased.

8. The control device of a multi-cylinder 4-cycle charge compression ignition-type internal combustion engine according to claim 6, wherein the controller:

obtains an operational state of the internal combustion engine, estimates an ignition timing of a preceding combustion, and controls the exhaust flow rate regulating valve so that when the estimated ignition timing is later than a reference value of ignition timing according to the obtained operational state, the opening of the exhaust flow rate regulating valve is decreased and when the estimated ignition timing is earlier than the reference value, the opening of the exhaust flow rate regulating valve is increased.

9. The control device of a multi-cylinder 4-cycle charge compression ignition-type internal combustion engine according to claim 6, wherein the controller:

obtains an operational state of the internal combustion engine, and controls the exhaust flow rate regulating valve so that the opening of the exhaust flow rate regulating valve is controlled according to the obtained operational state.

10. The control device of a multi-cylinder 4-cycle charge compression ignition-type internal combustion engine according to claim 9, wherein the controller:

obtains a temperature of the combustion gas exhausted from the combustion chamber, and controls the exhaust flow rate regulating valve so that as the obtained temperature of the combustion gas decreases, the opening of the exhaust flow rate regulating valve is decreased.

* * * * *